United States Patent
Furukawa et al.

(10) Patent No.: US 10,442,949 B2
(45) Date of Patent: Oct. 15, 2019

(54) COMPOSITION FOR ELECTRIC WIRE COATING MATERIAL AND INSULATED ELECTRIC WIRE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Toyoki Furukawa, Yokkaichi (JP); Hiroaki Kojima, Yokkaichi (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP)

(*) Notice: Subject to any disclaimer, the term of this patent is extended or adjusted under 35 U.S.C. 154(b) by 46 days.

(21) Appl. No.: 15/759,454

(22) PCT Filed: Sep. 23, 2016

(86) PCT No.: PCT/JP2016/077983
§ 371 (c)(1),
(2) Date: Mar. 12, 2018

(87) PCT Pub. No.: WO2017/057177
PCT Pub. Date: Apr. 6, 2017

(65) Prior Publication Data
US 2018/0215943 A1    Aug. 2, 2018

(30) Foreign Application Priority Data

Oct. 1, 2015   (JP) .................................. 2015-195670

(51) Int. Cl.
*C09D 127/06* (2006.01)
*C08L 23/08* (2006.01)
(Continued)

(52) U.S. Cl.
CPC ............ *C09D 127/06* (2013.01); *C08L 23/08* (2013.01); *H01B 3/441* (2013.01); *H01B 3/443* (2013.01); *H01B 3/448* (2013.01); *H01B 7/02* (2013.01)

(58) Field of Classification Search
USPC .............................. 524/524, 527; 174/110 V
See application file for complete search history.

(56) References Cited

U.S. PATENT DOCUMENTS 4,373,051 A * 2/1983 Memering ............... C08J 3/226
  524/427
2014/0079951 A1   3/2014 Yamauchi
(Continued)

FOREIGN PATENT DOCUMENTS

JP       S5659855 A     5/1981
JP       S60219249 A    11/1985
(Continued)

OTHER PUBLICATIONS

On-line translation of detailed description of JP 2013-231134A (Year: 2013).*
(Continued)

*Primary Examiner* — Fred M Teskin
(74) *Attorney, Agent, or Firm* — Reising Ethington, P.C.

(57) ABSTRACT

A composition for an electric wire coating material that has excellent damage resistance, low-temperature flexibility, tear resistance, and thermal stability, and an insulated electric wire in which this composition is used. The composition for an electric wire coating material containing polyvinyl chloride contains a plasticizer in an amount of 15 to 30 parts by mass and one or more ethylene-based copolymers selected from ethylene-vinyl ester copolymers and ethylene-α,β-unsaturated carboxylic acid ester copolymers in an amount of 0.1 to 10 parts by mass, with respect to 100 parts by mass of the polyvinyl chloride. An insulated electric wire is obtained by coating an outer circumference of a conductor with an insulating coating layer, with this composition for an electric wire coating material used in an electric wire coating material.

7 Claims, 4 Drawing Sheets

(51) Int. Cl.
*H01B 3/44* (2006.01)
*H01B 7/02* (2006.01)

(56) References Cited

U.S. PATENT DOCUMENTS

2015/0240104 A1* 8/2015 Taniguchi ............ C09D 127/06
428/375
2016/0071629 A1 3/2016 Horiuchi et al.

FOREIGN PATENT DOCUMENTS

| | | | |
|---|---|---|---|
| JP | 2013231134 | A | 11/2013 |
| JP | 2014043508 | A | 3/2014 |
| JP | 2015143299 | A | 8/2015 |

OTHER PUBLICATIONS

International Preliminary Report on Patentability for Application No. PCT/JP2016/077983 dated Sep. 23, 2016; 6 pages.
International Search Report for Application No. PCT/JP2016/077983 dated Nov. 22, 2016; 6 pages.

* cited by examiner

COMPOSITION FOR ELECTRIC WIRE COATING MATERIAL AND INSULATED ELECTRIC WIRE

CROSS REFERENCE TO RELATED APPLICATIONS

This application claims the priority of Japanese patent application JP2015-195670 filed on Oct. 1, 2015, the entire contents of which are incorporated herein.

TECHNICAL FIELD

The present invention relates to a composition for an electric wire coating material and an insulated electric wire, and specifically to a composition for an electric wire coating material that is suitable as a coating material for an electric wire routed in a vehicle such as a car, and an insulated electric wire in which this composition is used.

BACKGROUND ART

An electric wire coating material is conventionally known, in which a polyvinyl chloride-containing composition that contains polyvinyl chloride is used. In order to provide flexibility, for example, usually, a plasticizer is blended into this type of electric wire coating material.

As this type of electric wire coating material, for example, Patent Document 1 (Japanese Patent 5423890) discloses an electric wire coating material obtained by adding a plasticizer, chlorinated polyethylene, and a methyl methacrylate-butadiene-styrene resin to polyvinyl chloride. Also, for example, Patent Document 2 (JP2002-322330A) discloses an electric wire coating material obtained by adding a plasticizer, high-density polyethylene (HDPE), and ethylene-vinyl acetate-vinyl chloride copolymer to polyvinyl chloride.

SUMMARY

In an electric wire coating material in which a polyvinyl chloride-containing composition is used, if the amount of the plasticizer is increased, the material has excellent flexibility, but there is a high possibility that the electric wire coating will deteriorate due to external damage and its damage resistance tends to decrease. In view of this, if the amount of the plasticizer is reduced, its damage resistance tends to increase, but its low-temperature characteristics decrease. To address this problem, in Patent Document 1, low-temperature characteristics are ensured by adding chlorinated polyethylene and methyl methacrylate-butadiene-styrene resin to polyvinyl chloride.

However, if the amount of the plasticizer in an electric wire coating material in which a polyvinyl chloride-containing composition is used is reduced, there is a problem not only in that its low-temperature characteristics decrease but also in that the electric wire coating cracks when a load such as bending is applied to the electric wire coating after minute damage is formed externally on the electric wire coating (decrease in tear resistance). Reducing the thickness of the electric wire coating when trying to decrease the diameter of an electric wire makes this problem particularly significant.

Also, the damage resistance is increased by adding an ethylene-vinyl acetate-vinyl chloride copolymer as a compatibilizer for polyvinyl chloride and high-density polyethylene in Patent Document 2, but the ethylene-vinyl acetate-vinyl chloride copolymer is not versatile and is expensive, and has a small damage resistance improvement effect.

An object of the present application is to provide a composition for an electric wire coating material that has excellent damage resistance, low-temperature flexibility, tear resistance, and thermal stability, and an insulated electric wire in which this composition is used.

In order to resolve the above-described issue, the composition for an electric wire coating material according to the present application is a composition for an electric wire coating material containing polyvinyl chloride, the composition containing a plasticizer in an amount of 15 to 30 parts by mass, and one or more ethylene-based copolymers selected from ethylene-vinyl ester copolymers and ethylene-α,β-unsaturated carboxylic acid ester copolymers in an amount of 0.1 to 10 parts by mass, with respect to 100 parts by mass of the polyvinyl chloride.

It is preferable that a main chain of the ethylene-vinyl ester copolymer has a ketone backbone. It is preferable that the ethylene-vinyl ester copolymer contains a vinyl ester in an amount of 30 mass % or more.

It is preferable that the ethylene-α,β-unsaturated carboxylic acid ester copolymer contains an α,β-unsaturated carboxylic acid ester in an amount of 15 mass % or more. It is preferable that a melt flow rate, which is measured in conformity with JIS K 7210, of the ethylene-α,β-unsaturated carboxylic acid ester copolymer at 190° C. and a load of 2.16 kg is 5 g/10 minutes or less.

It is preferable that the composition further contains a filler in an amount of 2 to 25 parts by mass with respect to 100 parts by mass of the polyvinyl chloride. It is preferable that the filler is calcium carbonate. It is preferable that an average particle diameter of the filler is in a range of 0.05 to 1.5 μm.

In an insulated electric wire according to the present application, the composition for an electric wire coating material according to any of the above-described aspects is used in an electric wire coating material.

According to the composition for an electric wire coating material according to the present application, the composition for an electric wire coating material containing polyvinyl chloride contains a plasticizer in an amount of 15 to 30 parts by mass, and one or more ethylene-based copolymers selected from ethylene-vinyl ester copolymers and ethylene-α,β-unsaturated carboxylic acid ester copolymers in an amount of 0.1 to 10 parts by mass, with respect to 100 parts by mass of polyvinyl chloride, and thus the composition for an electric wire coating material has excellent damage resistance, low-temperature flexibility, tear resistance, and thermal stability. Also, an insulated electric wire in which this composition is used in an electric wire coating material has excellent damage resistance, low-temperature flexibility, tear resistance, and thermal stability.

If the main chain of the ethylene-vinyl ester copolymer has a ketone backbone, the damage resistance, low-temperature flexibility, and tear resistance are further increased. If the ethylene-vinyl ester copolymer contains a vinyl ester in an amount of 30 mass % or more, the tear resistance is further increased.

If the ethylene-α,β-unsaturated carboxylic acid ester copolymer contains an α,β-unsaturated carboxylic acid ester in an amount of 15 mass % or more, the tear resistance is further increased. If the melt flow rate of the ethylene-α,β-unsaturated carboxylic acid ester copolymer is 5 g/10 minutes or less, the low-temperature flexibility is further increased.

If the composition further contains a filler in an amount of 2 to 25 parts by mass with respect to 100 parts by mass of the polyvinyl chloride, the composition has excellent abrasion resistance. If the filler is calcium carbonate, the abrasion resistance is further increased. If an average particle diameter of the filler is in a range of 0.05 to 1.5 μm, the abrasion resistance is further increased.

BRIEF DESCRIPTION OF DRAWINGS

FIG. 1 shows an insulated electric wire according to one embodiment of the present application.

FIG. 2 shows a schematic diagram illustrating a method for evaluating damage resistance.

FIG. 3 shows a schematic diagram illustrating a method for evaluating damage resistance.

DESCRIPTION OF EMBODIMENTS

Next, an embodiment of the present application will be described in detail.

A composition for an electric wire coating material may contain polyvinyl chloride, and a plasticizer and a specific ethylene-based copolymer, in addition to polyvinyl chloride.

The composition contains the plasticizer in an amount of 15 to 30 parts by mass with respect to 100 parts by mass of polyvinyl chloride. If the content of the plasticizer exceeds 30 parts by mass, its damage resistance is not satisfactory, and thus the content of the plasticizer is set to at most 30 parts by mass. Also, if the content of the plasticizer is less than 15 parts by mass, its low-temperature flexibility, tear resistance, and thermal stability are not satisfactory, and thus the content of the plasticizer is set to at least 15 parts by mass. The content of the plasticizer is more preferably in a range of 15 to 27.5 parts by mass.

Although there is no particular limitation on the plasticizer, from the viewpoint of obtaining excellent low-temperature flexibility and tear resistance, phthalic acid esters, trimellitic acid esters, pyromellitic acid esters, adipic acid esters, sebacic acid esters, and azelaic acid esters are preferable. These may be used alone or in combination as the plasticizer.

Examples of alcohol that constitutes an ester for the plasticizer include saturated fatty alcohols each having 8 to 13 carbon atoms. One or more of these alcohols may be used. More specifically, examples of alcohol include 2-ethylhexyl, n-octyl, isononyl, dinonyl, isodecyl, and tridecyl alcohols.

If the composition contains the plasticizer in an amount of 15 to 30 parts by mass with respect to 100 parts by mass of polyvinyl chloride, the composition contains the specific ethylene-based copolymer in an amount of 0.1 to 10 parts by mass with respect to 100 parts by mass of polyvinyl chloride. If the content of the specific ethylene-based copolymer exceeds 10 parts by mass, its damage resistance and thermal stability are not satisfactory, and thus the content of the specific ethylene-based copolymer is set to not more than 10 parts by mass. Also if the content of the specific ethylene-based copolymer is less than 0.1 parts by mass, its tear resistance is not satisfactory and the effect of improving the low-temperature flexibility is small. Therefore, the content of the specific ethylene-based copolymer is set to at least 0.1 parts by mass. The content of the specific ethylene-based copolymer is more preferably in a range of 1.0 to 5 parts by mass, and even more preferably in a range of 3 to 4 parts by mass.

The specific ethylene-based copolymer is one or more selected from ethylene-vinyl ester copolymers and ethylene-α,β-unsaturated carboxylic acid ester copolymers. The specific ethylene-based copolymer may be constituted by one or more ethylene-vinyl ester copolymers, or one or more ethylene-α,β-unsaturated carboxylic acid ester copolymers. The specific ethylene-based copolymer is preferably constituted by one or more ethylene-vinyl ester copolymers.

Examples of the ethylene-vinyl ester copolymers include ethylene-vinyl acetate bipolymers, ethylene-vinyl acetate-carbon monoxide terpolymers, ethylene-vinyl propionate bipolymers, ethylene-vinyl stearate bipolymers, and ethylene-vinyl trifluoroacetate bipolymers. The ethylene-vinyl ester copolymers may be used alone or in combination. From the viewpoint of further increasing the damage resistance, low-temperature flexibility, and tear resistance, ethylene-vinyl acetate-carbon monoxide terpolymers whose main chain has a ketone backbone are particularly preferable as the ethylene-vinyl ester copolymer. Also, from the viewpoint of further increasing the tear resistance, the ethylene-vinyl ester copolymer preferably contains a vinyl ester in an amount of 30 mass % or more. The ethylene-vinyl ester copolymer more preferably contains a vinyl ester in an amount of 35 mass % or more. Note that from the viewpoint of the damage resistance, low-temperature flexibility, tear resistance, thermal stability, and the like, there is no particular limitation on the upper limit of the vinyl ester content of the ethylene-vinyl ester copolymer, but from the viewpoint of easy obtainment and excellent cost, the ethylene-vinyl ester copolymer need only contain a vinyl ester in an amount of 50 mass % or less.

Examples of the ethylene-α,β-unsaturated carboxylic acid ester copolymer include ethylene-methyl acrylate bipolymers, ethylene-ethyl acrylate bipolymers, ethylene-butyl acrylate bipolymers, ethylene-methyl methacrylate bipolymers, ethylene-ethyl methacrylate bipolymers, and ethylene-butyl methacrylate bipolymers. One of these ethylene-α,β-unsaturated carboxylic acid ester copolymers may be used alone or in combination. From the viewpoint of further increasing the tear resistance, the ethylene-α,β-unsaturated carboxylic acid ester copolymer preferably contains an α,β-unsaturated carboxylic acid ester in an amount of 15 mass % or more. The ethylene-α,β-unsaturated carboxylic acid ester copolymer more preferably contains an α,β-unsaturated carboxylic acid ester in an amount of 18 mass % or more. Note that from the viewpoint of the damage resistance, low-temperature flexibility, tear resistance, and thermal stability, there is no particular limitation on the upper limit of the α,β-unsaturated carboxylic acid ester content of the ethylene-α,β-unsaturated carboxylic acid ester copolymer, but from the viewpoint of easy obtainment and excellent cost, the ethylene-α,β-unsaturated carboxylic acid ester copolymer may preferably contain an α,β-unsaturated carboxylic acid ester in an amount of 30 mass % or less.

Also, from the viewpoint of further increasing the low-temperature flexibility, the ethylene-α,β-unsaturated carboxylic acid ester copolymer preferably has a melt flow rate (MFR) of 5 g/10 minutes or less at 190° C. and a load of 2.16 kg. The melt flow rate thereof is more preferably 3 g/10 minutes or less. The melt flow rate of the ethylene-α,β-unsaturated carboxylic acid ester copolymer is measured in conformity with JIS K 7210. Note that from the viewpoint of the damage resistance, low-temperature flexibility, tear resistance, and thermal stability, the lower limit of the melt flow rate of the ethylene-α,β-unsaturated carboxylic acid ester copolymer is not particularly limited, but from the viewpoint of a decrease in the melting viscosity, stabilizing manufacture by making it easier to suppress variation in the outer diameter of an electric wire and the like, the lower limit thereof may be preferably 0.1 g/10 minutes or more.

Although there is no particular limitation on polyvinyl chloride, from the viewpoint of obtaining excellent damage resistance, the degree of polymerization is preferably at least 800. Also, from the viewpoint of obtaining excellent tear resistance and thermal stability, the degree of polymerization is preferably not more than 2800. More preferably, the degree of polymerization is in a range of 1300 to 2500.

The composition for an electric wire coating material according to the present application does not contain high density polyethylene as a polymer component, and differs from the invention disclosed in Patent Document 2 above in at least this respect. In this meaning, in the composition for an electric wire coating material according to the present application, the polymer component may be constituted by polyvinyl chloride and a specific ethylene-based polymer and contain no polymer component other than these. Also, in the composition for an electric wire coating material according to the present application, the addition amount of the plasticizer is less than the range disclosed in Patent Document 2 above, and the composition differs from Patent Document 2 above in this respect as well.

The composition for an electric wire coating material according to the present application may contain a filler. It is preferable that the composition further contains a filler in an amount of 2 to 25 parts by mass with respect to 100 parts by mass of the polyvinyl chloride. If the content of the filler is 2 parts by mass or more, the composition has superior abrasion resistance. Also, if the content of the filler is 25 parts by mass or less, the composition has superior abrasion resistance. The content of the filler is more preferably in a range of 5 to 20 parts by mass, and even more preferably in a range of 7.5 to 15 parts by mass.

In general, if the composition contains an excessive amount of the filler, the composition has a significant cost reduction effect, but the outer appearance of an insulating coating becomes rough when an insulated electric wire is manufactured (during extrusion coating, for example) or the like, and various electric wire properties, in particular, the abrasion resistance, often decrease. In contrast, in the present application, use of the filler and the specific ethylene-based copolymer in combination makes it possible to not only suppress a decrease in the electric wire properties such as abrasion resistance caused by blending of the filler but also increase the abrasion resistance.

Examples of the filler include calcium carbonate, clay, and talc. These may be used alone or in combination as the filler. Among these, from the viewpoint of an excellent abrasion resistance increase effect due to use of the filler in combination with the specific ethylene-based copolymer, calcium carbonate is preferable. Examples of calcium carbonate include synthetic calcium carbonate and heavy calcium carbonate. The filler may be subjected to surface treatment using a surface treatment agent. It is preferable that an average particle diameter of the filler is in a range of 0.05 to 1.5 μm. The average particle diameter thereof is more preferably in a range of 0.5 to 1.3 μm. If the average particle diameter is in a range of 0.05 to 1.5 μm, the abrasion resistance is further increased. The average particle diameter of the filler can be measured through laser light scattering.

The composition for an electric wire coating material according to the present application may also contain components other than polyvinyl chloride, the plasticizer, and the specific ethylene-based polymer within a range not impairing the object of the present application. Examples of other components include additives that are usually used in an electric wire coating material, such as stabilizers, processing aids, low-temperature modifiers, and expanders.

An example of a processing aid is chlorinated polyethylene. Examples of low-temperature modifiers include methyl methacrylate-butadiene-styrene copolymers (MB S). Although there is no particular limitation on the content of the low-temperature modifier, from the viewpoint of obtaining excellent damage resistance, the content of the low-temperature modifier is preferably not more than 6 parts by mass with respect to 100 parts by mass of polyvinyl chloride. The content of the low-temperature modifier is more preferably not more than 4 parts by mass and even more preferably not more than 3 parts by mass. Also, from the viewpoint of obtaining excellent low-temperature flexibility, the content of the low-temperature modifier is preferably at least 1 part by mass with respect to 100 parts by mass of polyvinyl chloride.

The composition for an electric wire coating material according to the present application can be prepared by blending the plasticizer, the specific ethylene-based polymer, and various additive components that are added as needed, into polyvinyl chloride that serves as a base resin, and kneading while heating the mixture, for example. At this time, a general kneader such as a banbury mixer, a pressure kneader, a kneading extruder, a twin screw extruder, or a roll may be used. Before the mixture is kneaded and heated, the components may be dry-blended in advance using a tumbler or the like. After the mixture is kneaded and heated, a composition is retrieved from the kneader. At this time, the composition may be molded into pellets using a pelletizer.

Next, an insulated electric wire according to the present application will be described.

Figure 1A:
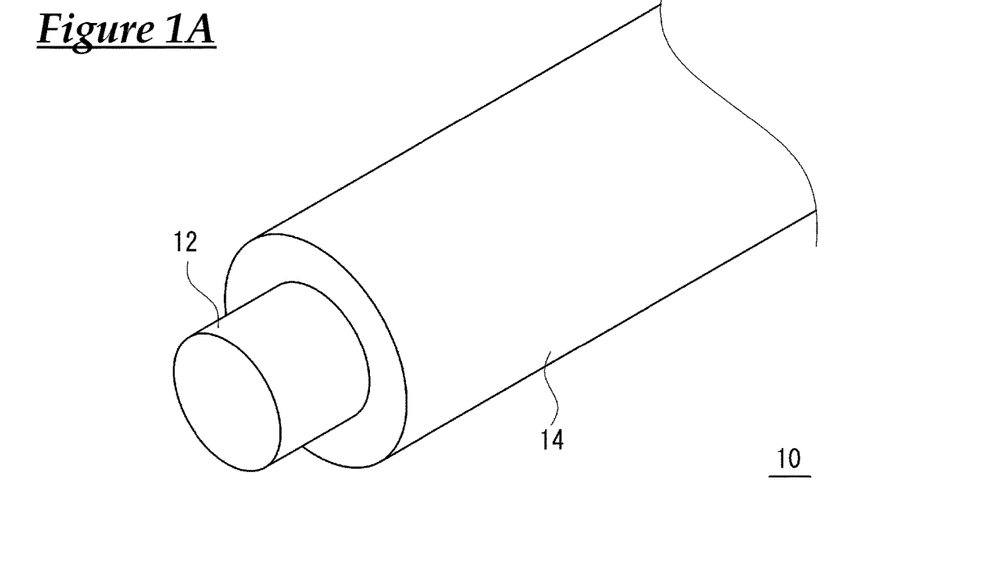
FIG. 1(a) shows a perspective view and FIG. 1(b) shows a cross-sectional view in a circumferential direction.
Figure 1B:
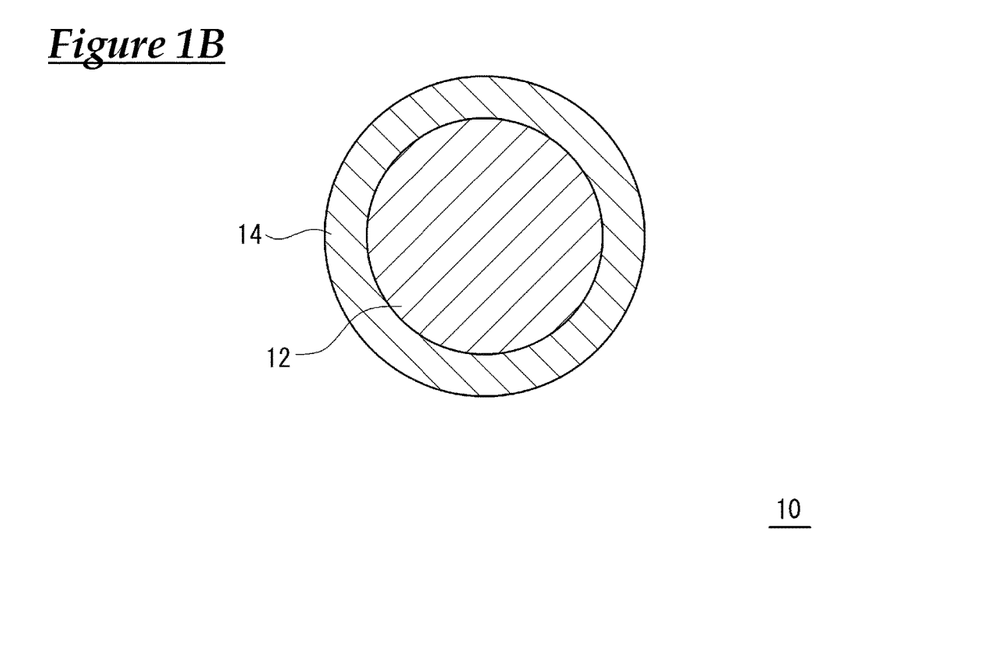

FIG. 1(a) shows a perspective view of an insulated electric wire according to one embodiment and FIG. 1(b) shows a cross-sectional view (cross-sectional view in its circumferential direction). As shown in FIG. 1, an insulated electric wire 10 includes a conductor 12 and an insulating coating layer (electric wire coating material) 14 for coating the outer circumference of the conductor 12. The insulating coating layer 14 is formed using the composition for an electric wire coating material according to the present application. The insulated electric wire 10 can be obtained by subjecting the outer circumference of the conductor 12 to extrusion coating with the composition for an electric wire coating material according to the present application.

Although copper is ordinarily used as the conductor 12, a metal material such as aluminum or magnesium may also be used instead of copper. The metal material may also be an alloy. Examples of other metals for obtaining an alloy include iron, nickel, magnesium, silicon, and combinations thereof. The conductor 12 may be constituted by a single wire or a twisted wire obtained by twisting a plurality of wires.

According to the composition for an electric wire coating material and the insulated electric wire having the above-described configurations, the composition for an electric wire coating material contains the plasticizer in an amount of 15 to 30 parts by mass and the specific ethylene-based polymer in an amount of 0.1 to 10 parts by mass with respect to 100 parts by mass of polyvinyl chloride, and thus the composition and the insulated electric wire have excellent damage resistance, low-temperature flexibility, tear resistance, and thermal stability. Moreover, since the composition contains a predetermined amount of the specific ethylene-based polymer, its low-temperature flexibility is maintained without increasing the amount of the plasticizer, and its tear resistance is also satisfactory.

The insulated electric wire according to the present application has excellent damage resistance, low-temperature flexibility, tear resistance, and thermal stability, and thus is suitable as a thin-wall electric wire or a small-diameter electric wire. Examples of the thin-wall electric wire and the small-diameter electric wire include electric wires having an electric wire outer diameter of less than 1.1 mm. In this case, the standard thickness of the insulating coating layer is 0.25 mm or less. If the thickness of the insulating coating layer exceeds 0.25 mm, the thickness of the insulating coating layer is not sufficiently reduced. Also, if the thickness of the insulating coating layer exceeds 0.25 mm, the diameter of the outer diameter of the electric wire is less than 1.1 mm, and thus, the conductor becomes relatively thin and its conductivity becomes insufficient. Also, the thickness of the insulating coating layer is preferably 0.1 mm or more. If the thickness of the insulating coating layer is less than 0.1 mm, it becomes difficult to evenly form a coating film of the insulating coating layer, and there is a risk that the insulation property will not be sufficiently exhibited.

An example of the insulated electric wire according to the present application is such that a conductor is coated with the insulating coating layer, the outer diameter of the electric wire is less than 1.1 mm, the thickness of the insulating coating layer is 0.25 mm or less, and the composition for an electric wire coating material according to the present application is used as the material of the insulating coating layer.

Moreover, the insulated electric wire according to the present application can be utilized in various electric wires for automobiles, devices, information communication, power, ships, aircrafts, and the like. In particular, the insulated electric wire can be suitably utilized as an electric wire for an automobile.

Although the embodiments of the present application have been described in detail above, the present invention is not limited to any of the above-described embodiments, and it will be appreciated that various modifications can be made without departing from the gist of the present invention.

For example, the insulated electric wire may be formed into forms such as flat wires and shielded wires other than the single wire shown in FIG. 1. Also, the insulating layer may be constituted by two or more layers.

WORKING EXAMPLES

Hereinafter, working examples of the present application will be described in detail, but the present invention is not limited to the working examples.

Working Examples 1 to 24 and Comparative Examples 1 to 9

Preparation of Composition for Electric Wire Coating Material

Materials were blended with the blending compositions shown in Tables 1 to 3, a single screw extruder was used to mix the materials at 180° C., and a pelletizer was used to mold the obtained mixture into pellets. As a result, a composition for an electric wire coating material containing polyvinyl chloride was prepared.

Production of Insulated Electric Wire

An insulated electric wire was produced by extrusion molding the prepared composition for an electric wire coating material around a twisted wire conductor having a cross-sectional area of 0.5 mm$^2$ at a coating thickness of 0.2 mm.

Material Used

Polyvinyl chloride
  Degree of polymerization 1300: "Shin Daiichi Vinyl Corp., ZEST1300Z"
  Degree of polymerization 2500: "Shin Daiichi Vinyl Corp., ZEST2500Z"
Plasticizer
  Phthalic acid ester: "J-PLUS Co., Ltd., DUP"
  Trimellitic acid ester: "DIC Corporation, W-750"
Ethylene-vinyl ester copolymer
  EVA<1>: ethylene-vinyl acetate-carbon monoxide terpolymer, "Elvaloy 742" manufactured by DUPONT-MITSUI POLYCHEMICALS CO., LTD
  EVA<2>: ethylene-vinyl acetate bipolymer, with a vinyl acetate content of 40 mass %, "Evaflex EV 40LX" manufactured by DUPONT-MITSUI POLYCHEMICALS CO., LTD
  EVA<3>: ethylene-vinyl acetate bipolymer, with a vinyl acetate content of 25 mass %, "Evaflex EV 360" manufactured by DUPONT-MITSUI POLYCHEMICALS CO., LTD
Ethylene-$\alpha,\beta$-unsaturated carboxylic acid ester copolymer
  EMA<1>: ethylene-methyl acrylate bipolymer, with a methyl acrylate content of 18 mass %, MFR=2 g/10 minutes, "Elvaloy AC1218" manufactured by DUPONT-MITSUI POLYCHEMICALS CO., LTD
  EEA: ethylene-ethyl acrylate bipolymer, with an ethyl acrylate content of 12 mass %, MFR=1 g/10 minutes, "Elvaloy AC2112" manufactured by DUPONT-MITSUI POLYCHEMICALS CO., LTD
  EMA<2>: ethylene-methyl acrylate bipolymer, with a methyl acrylate content of 20 mass %, MFR=8 g/10 minutes, "Elvaloy AC1820" manufactured by DUPONT-MITSUI POLYCHEMICALS CO., LTD
  EMA<3>: ethylene-methyl acrylate bipolymer, with a methyl acrylate content of 13 mass %, MFR=9 g/10 minutes, "Elvaloy AC1913" manufactured by DUPONT-MITSUI POLYCHEMICALS CO., LTD
  The melt flow rate (MFR) of ethylene-$\alpha,\beta$-unsaturated carboxylic acid ester copolymer was the melt flow rate (MFR) measured in conformity with JIS K 7210 at 190° C. and a load of 2.16 kg.
Processing aid (chlorinated polyethylene): "Showa Denko K.K., Elaslen 301A"
Low-temperature modifier (MBS): "Kaneka Corporation, KANE ACE B-564"
Expander (calcium carbonate): "SHIRAISHI CALCIUM KAISHA, LTD., Hakuenka CCR"
Heat stabilizer: "ADEKA CORPORATION, RUP-110"
Filler
  Calcium carbonate<1>: average particle diameter 1.3 μm (catalog value), "MARUO CALCIUM, SUPER#1700"
  Calcium carbonate<2>: average particle diameter 2.7 μm (catalog value), "MARUO CALCIUM, SUPER S"
  Clay: average particle diameter 1.5 μm (catalog value), "TAKEHARA KAGAKU, Glomax LL"
  Talc: average particle diameter 1.6 μm (catalog value), "TAKEHARA KAGAKU, High micron HE5"

Evaluation

The damage resistance, low-temperature flexibility, tear resistance, and thermal stability of the produced insulated electric wires were evaluated based on the following evaluation methods. Also, the abrasion resistance was evaluated.

Evaluation Methods

Damage Resistance Evaluation

Figure 2A:
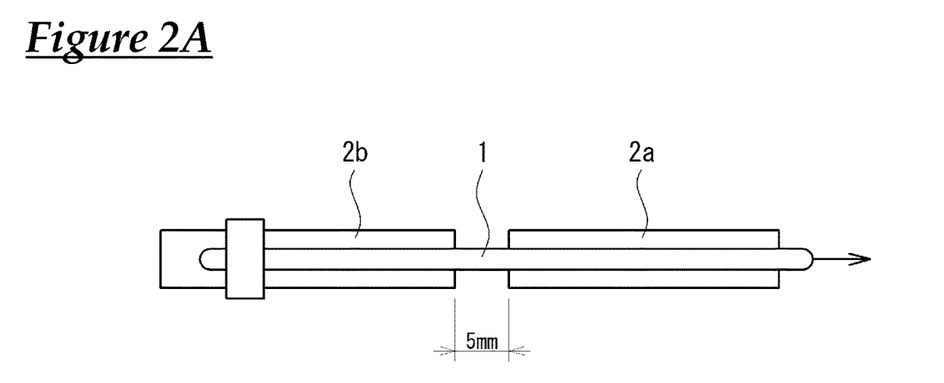
FIG. 2A shows a plan view and FIG. 2B shows a side view of a test piece undergoing a damage resistance evaluation.
Figure 2B:
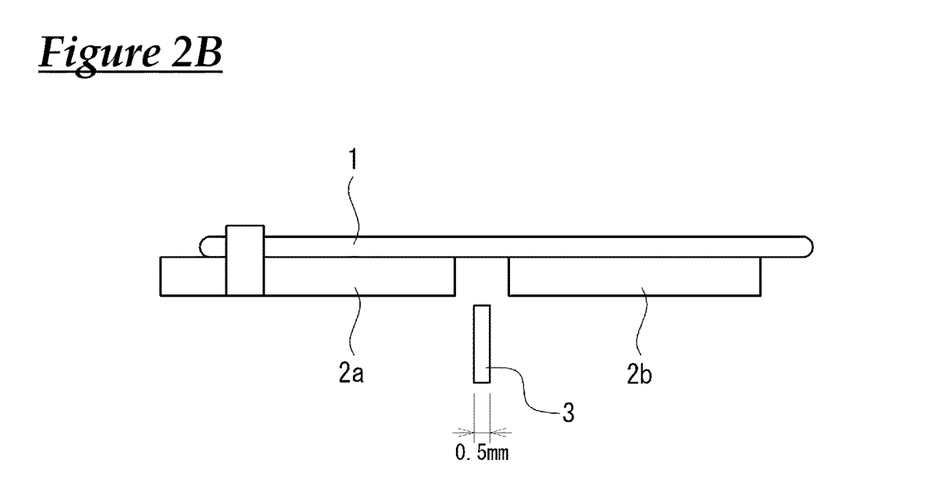

A test piece was obtained by cutting the produced insulated electric wire to a length of 300 mm. As shown in FIGS. 2(a) (plan view) and 2(b) (side view), a test piece 1 was placed on plastic plates 2a and 2b. The distance between the plastic plate 2a and the plastic plate 2b was 5 mm. The left end of the test piece 1 was fixed to the plastic plate 2b, and the test piece 1 was made straight by applying a tensile stress of 30 N to the right end of the test piece 1. Next, a metal piece 3 having a thickness of 0.5 mm was disposed at a position located 10 mm below a portion of the test piece 1 disposed between the plastic plate 2a and the plastic plate 2b, and about 0.8 mm away from the center in the radial direction of the test piece 1 toward its outer circumferential side.

Figure 3A:
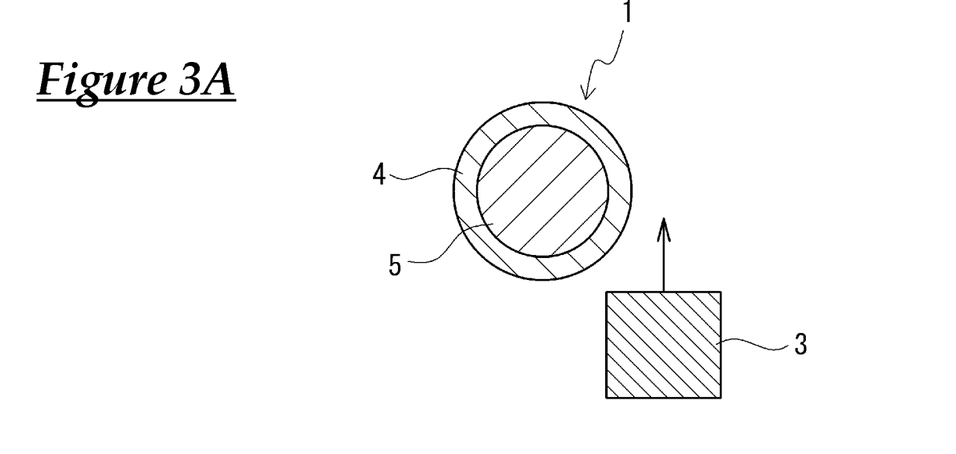
FIG. 3A shows a cross-sectional view of a metal piece before being brought into contact with a test piece.
Figure 3B:
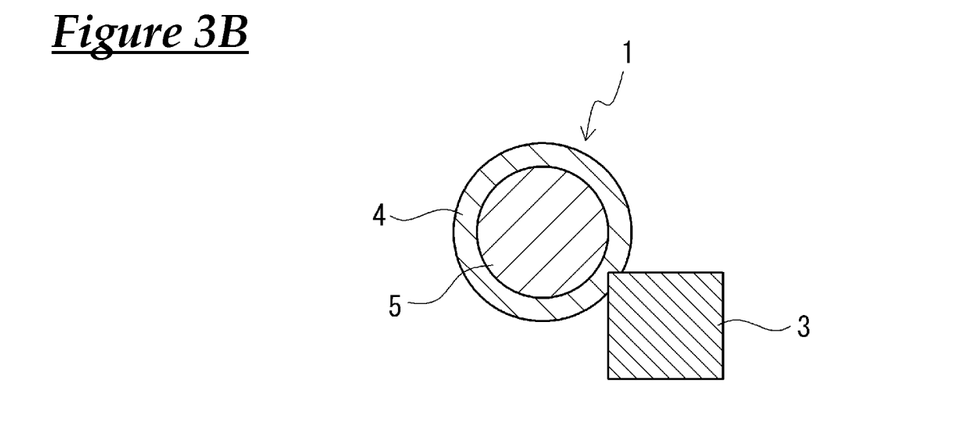
FIG. 3B shows a cross-sectional view of the metal piece being brought into contact with the test piece.
Figure 3C:
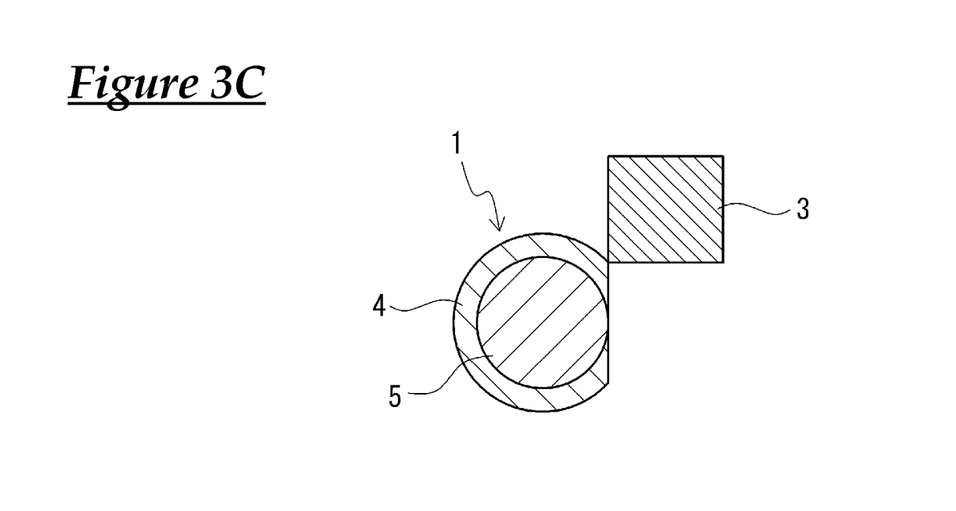
FIG. 3C shows a cross-sectional view of the metal piece after being brought into contact with the test piece.

Next, as shown in FIGS. 3(a) to 3(c), the metal piece 3 was moved upward at a speed of 50 mm/min while the metal piece 3 was brought into contact with a coating material 4 of the test piece 1, and a load that was applied to the metal piece 3 of the test piece 1 was measured. At that time, if a conductor 5 of the test piece 1 was not exposed, the metal piece 3 was brought closer to the test piece 1 in the central direction in increments of 0.01 mm, and measurement was continued until the conductor 5 was exposed. The upper limit load at which the conductor 5 was not exposed was regarded as the damage resistance capability of the test piece 1. If the conductor 5 was not exposed at a load of at least 12 N, its damage resistance was regarded as acceptable "O", whereas if the conductor 5 was not exposed at a load of at least 15 N, its damage resistance was regarded as excellent "+". On the other hand, if the conductor 5 was exposed at a load of less than 12 N, its damage resistance was regarded as not acceptable "−".

Low-Temperature Flexibility Evaluation

Figure 4:
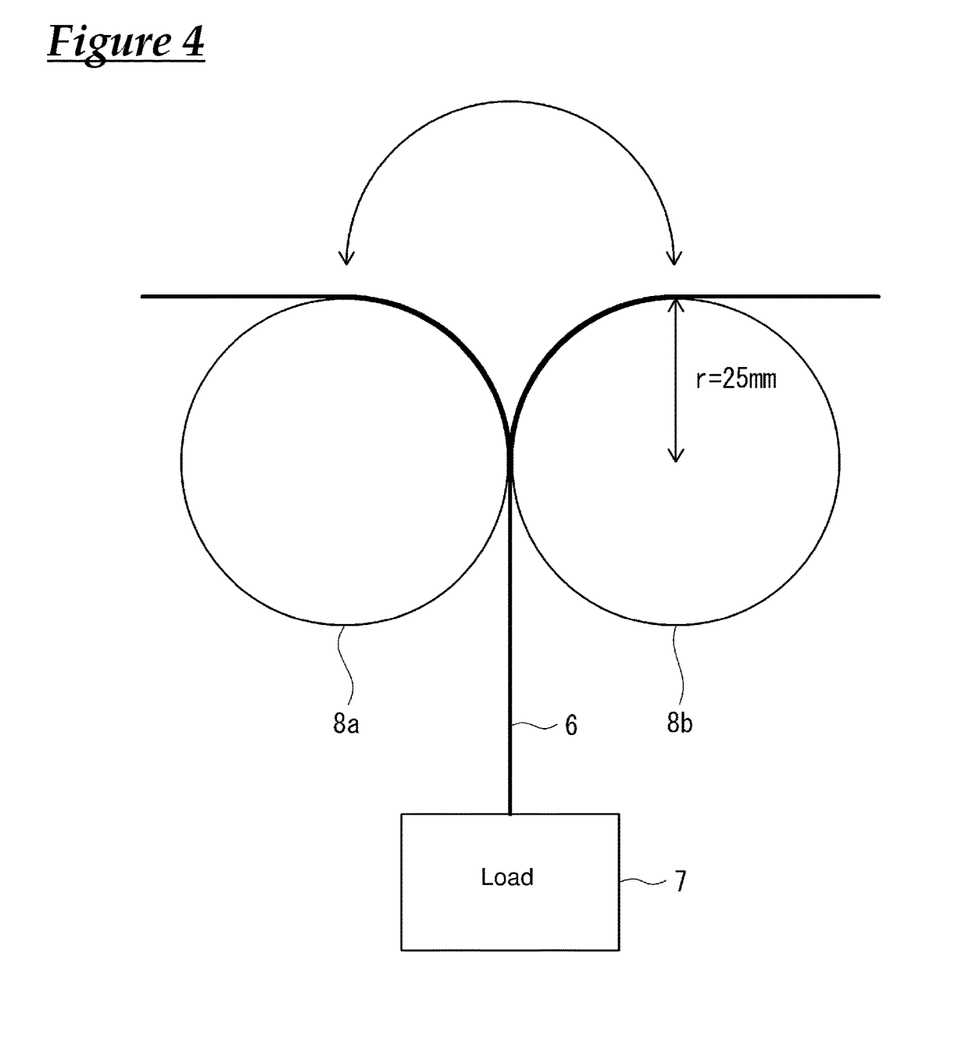
FIG. 4 shows a schematic diagram illustrating a method for evaluating low-temperature flexibility.

A test piece was obtained by cutting the produced insulated electric wire to a length of 350. 20 mm of the coating material was removed at both ends of that test piece. Next, as shown in FIG. 4, in a state in which one end of a test piece 6 was fixed to a rotary arm, a weight 7 was suspended from the other end, and the middle portion in the longitudinal direction of the test piece 6 was sandwiched between a pair of cylindrical members 8a and 8b (radium r=25 mm), the test piece 6 was repeatedly bent at a bending radius r by rotating the rotary arms 90 degrees in one direction and 90 degrees in the other direction such that the test piece 6 moved along the circumferential surfaces of the cylindrical members 8a and 8b, and thus low-temperature flexibility was evaluated. The load that was applied to the test piece 6 was 400 g, the testing temperature was −30° C., and the speed of repeating the bending operation was 60 reciprocations per minute. Flexibility was evaluated using the number of instances of bending (number of reciprocations) until the test piece 6 broke due to the bending test. If a test piece was bent at least 2000 times, it was regarded as acceptable "O", if a test piece was bent at least 3000 times, it was regarded as excellent "+", and if a test piece was bent less than 2000 times, it was regarded as not acceptable "−".

Tear Resistance Evaluation

An angled test piece as described in JIS K 6252 was produced using a sheet having a thickness of 1 mm that was produced using the prepared composition for an electric wire coating material, and its tear resistance was evaluated using a tension tester. The tear resistance was evaluated with a distance of 20 mm between the grips and a tension speed of 50 mm/min. If a test piece was fractured at a stroke of at least 10 mm (an apparent strain of at least 50%), its tear resistance was regarded as acceptable "O", whereas if a test piece was fractured at a stroke of at least 20 mm (an apparent strain of 100%), its tear resistance was regarded as excellent "+". On the other hand, if a test piece was fractured at a stroke of less than 10 mm, its tear resistance was regarded as not acceptable "−".

Thermal Stability Evaluation

The prepared composition for an electric wire coating material was introduced into a labo plastomill/R60 set at 210° C., kneaded at 60 rotations/min, and a time period until a sharp rise in the torque was observed was evaluated as the index for the thermal stability. The case where the time period until a sharp rise in the torque was observed was 60 minutes or more was evaluated as excellent "+" in thermal stability, and the case where the time period was less than 60 minutes was evaluated as poor "−" in thermal stability.

Abrasion Resistance Evaluation

Abrasion resistance was evaluated using a blade reciprocating method in conformity with ISO6722. The load that was applied to a blade was set to 7N, the case where the minimum value in four instances of testing was 300 or more was evaluated as acceptable "O", the case where it was 500 or more was evaluated as excellent "+", the case where it was 1000 or more was evaluated as particularly excellent "++", and the case where it was less than 300 was evaluated as not acceptable "−".

The blending ratios of the electric wire coating materials and evaluation results are shown in Tables 1 to 3. Note that the values shown in Tables 1 to 3 are expressed in parts by mass.

TABLE 1

| | | Working Examples | | | | | | | | | |
|---|---|---|---|---|---|---|---|---|---|---|---|
| | | 1 | 2 | 3 | 4 | 5 | 6 | 7 | 8 | 9 | 10 |
| Polyvinyl chloride | degree of polymerization 1300 | 100 | 100 | 100 | 100 | 100 | 100 | 100 | 100 | 100 | |
| | degree of polymerization 2500 | | | | | | | | | | 100 |
| Plasticizer | phthalic acid ester | | | | | | | | | | |
| | trimellitic acid ester | 20 | 20 | 20 | 20 | 20 | 20 | 20 | 20 | 20 | 20 |

TABLE 1-continued

| | | Working Examples | | | | | | | | | |
|---|---|---|---|---|---|---|---|---|---|---|---|
| | | 1 | 2 | 3 | 4 | 5 | 6 | 7 | 8 | 9 | 10 |
| Ethylene-vinyl ester copolymer | EVA 1 | 5 | 0.1 | 10 | | | | | | | 5 |
| | EVA 2 | | | | 5 | | | | | | |
| | EVA 3 | | | | | 5 | | | | | |
| Ethylene-α,β-unsaturated carboxylic acid ester copolymer | EMA 1 | | | | | | 5 | | | | |
| | EEA | | | | | | | 5 | | | |
| | EMA 2 | | | | | | | | 5 | | |
| | EMA 3 | | | | | | | | | 5 | |
| Additive | processing aid | | | | | | | | | | |
| | low-temperature modifier | | | | | | | | | | |
| | expander | | | | | | | | | | |
| | heat stabilizer | 5 | 5 | 5 | 5 | 5 | 5 | 5 | 5 | 5 | 5 |
| Filler | calcium carbonate<1> | | | | | | | | | | |
| | calcium carbonate<2> | | | | | | | | | | |
| | clay | | | | | | | | | | |
| | talc | | | | | | | | | | |
| Evaluation result | damage resistance | + | + | + | O | O | O | O | O | O | + |
| | abrasion resistance | O | O | O | O | O | O | O | O | O | O |
| | tear resistance | + | + | + | + | O | + | O | + | O | + |
| | low-temperature flexibility | + | + | + | O | O | + | + | O | O | + |
| | thermal stability | + | + | + | + | + | + | + | + | + | + |

\* "+" = excellent, "O" = acceptable

TABLE 2

| | | Working Examples | | | | | | | | | | | | | |
|---|---|---|---|---|---|---|---|---|---|---|---|---|---|---|
| | | 11 | 12 | 13 | 14 | 15 | 16 | 17 | 18 | 19 | 20 | 21 | 22 | 23 | 24 |
| Polyvinyl chloride | degree of polymerization 1300 | 100 | 100 | 100 | 100 | 100 | 100 | 100 | 100 | 100 | 100 | 100 | 100 | 100 | 100 |
| | degree of polymerization 2500 | | | | | | | | | | | | | | |
| Plasticizer | phthalic acid ester | | | 20 | | | | | | | | | | | |
| | trimellitic acid ester | 15 | 30 | | 20 | 20 | 20 | 20 | 20 | 20 | 20 | 20 | 20 | 20 | 20 |
| Ethylene-vinyl ester copolymer | EVA 1 | 5 | 5 | 5 | 5 | 5 | 5 | 5 | 5 | 5 | 5 | 5 | 5 | 0.1 | 10 |
| | EVA 2 | | | | | | | | | | | | | | |
| | EVA 3 | | | | | | | | | | | | | | |
| Ethylene-α,β-unsaturated carboxylic acid ester copolymer | EMA 1 | | | | | | | | | | | | | | |
| | EEA | | | | | | | | | | | | | | |
| | EMA 2 | | | | | | | | | | | | | | |
| | EMA 3 | | | | | | | | | | | | | | |
| Additive | processing aid | | | | 5 | | | | | | | | | | |
| | low-temperature modifier | | | | | 5 | | | | | | | | | |
| | expander | | | | | | 15 | | | | | | | | |
| | heat stabilizer | 5 | 5 | 5 | 5 | 5 | 5 | 5 | 5 | 5 | 5 | 5 | 5 | 5 | 5 |
| Filler | calcium carbonate<1> | | | | | | | | 10 | | | 2 | 25 | 10 | 10 |
| | calcium carbonate<2> | | | | | | | | | 10 | | | | | |
| | clay | | | | | | | | | | 10 | | | | |
| | talc | | | | | | | | | | 10 | | | | |
| Evaluation result | damage resistance | + | + | + | + | + | + | + | O | O | O | + | + | + | + |
| | abrasion resistance | O | O | O | O | O | O | ++ | + | + | + | ++ | ++ | ++ | ++ |
| | tear resistance | + | + | + | + | + | + | + | O | O | O | + | + | + | + |

TABLE 2-continued

|  |  | Working Examples | | | | | | | | | | | | | |
| --- | --- | --- | --- | --- | --- | --- | --- | --- | --- | --- | --- | --- | --- | --- |
|  |  | 11 | 12 | 13 | 14 | 15 | 16 | 17 | 18 | 19 | 20 | 21 | 22 | 23 | 24 |
|  | low-temperature flexibility | + | + | + | + | + | + | + | O | O | O | + | + | + | + |
|  | thermal stability | + | + | + | + | + | + | + | O | O | O | + | + | + | + |

* "++" = particularly excellent, "+" = excellent, "O" = acceptable

TABLE 3

|  |  | Comparative Examples | | | | | | | | |
| --- | --- | --- | --- | --- | --- | --- | --- | --- | --- | --- |
|  |  | 1 | 2 | 3 | 4 | 5 | 6 | 7 | 8 | 9 |
| Polyvinyl chloride | degree of polymerization 1300 | 100 | 100 | 100 | 100 | 100 | 100 | 100 | 100 | 100 |
|  | degree of polymerization 2500 | | | | | | | | | |
| Plasticizer | phthalic acid ester | | | | | | | | | |
|  | trimellitic acid ester | 20 | 20 | 20 | 20 | 12.5 | 32.5 | 20 | 20 | 20 |
| Ethylene-vinyl ester copolymer | EVA 1 | | 0.01 | 12 | | 5 | 5 | | | |
|  | EVA 2 | | | | | | | | | |
|  | EVA 3 | | | | | | | | | |
| Ethylene-α,β-unsaturated carboxylic acid ester copolymer | EMA 1 | | | | | | | | | |
|  | EEA | | | | | | | | | |
|  | EMA 2 | | | | | | | | | |
|  | EMA 3 | | | | | | | | | |
| Additive | processing aid | | | | | | | | 5 | |
|  | low-temperature modifier | | | | 5 | | | | | 5 |
|  | expander | | | | | | | | | |
|  | heat stabilizer | 5 | 5 | 5 | 5 | 5 | 5 | 5 | 5 | 5 |
| Filler | calcium carbonate<1> | | | | | | | 10 | 10 | 10 |
|  | calcium carbonate<2> | | | | | | | | | |
|  | clay | | | | | | | | | |
|  | talc | | | | | | | | | |
| Evaluation result | damage resistance | + | + | − | − | + | − | − | − | − |
|  | abrasion resistance | O | O | O | O | O | O | − | − | − |
|  | tear resistance | − | − | + | − | − | + | − | − | − |
|  | low-temperature flexibility | − | − | + | + | − | + | − | − | O |
|  | thermal stability | + | + | + | + | + | + | + | + | + |

* "+" = excellent, "O" = acceptable, "−" = not acceptable/poor

In Comparative Examples 1 and 7, no specific ethylene-based copolymer was blended into polyvinyl chloride, and thus if the plasticizer was added in a small amount, low-temperature flexibility and tear resistance were not satisfactory. In Comparative Example 2, too little specific ethylene-based copolymer was blended into the polyvinyl chloride, and thus if the plasticizer was added in a small amount, its low-temperature flexibility and tear resistance were not satisfactory. In Comparative Example 3, too much specific ethylene-based copolymer was blended into the polyvinyl chloride, and thus damage resistance was not satisfactory. In Comparative Examples 4 and 9, a low-temperature modifier (MBS) was blended into the polyvinyl chloride instead of the specific ethylene-based copolymer, and thus low-temperature flexibility was satisfactory but damage resistance and tear resistance were not. In Comparative Example 5, a predetermined amount of the specific ethylene-based copolymer was blended into the polyvinyl chloride, but too little plasticizer was added, and thus low-temperature flexibility and tear resistance were not satisfactory. In Comparative Example 6, a predetermined amount of a specific ethylene-based copolymer was blended into the polyvinyl chloride, but an excessive amount of the plasticizer was added, and thus damage resistance was not satisfactory. In Comparative Example 8, a processing aid (chlorinated PE) was blended into polyvinyl chloride instead of the specific ethylene-based copolymer, and thus the damage resistance, tear resistance, and low-temperature flexibility were not satisfactory.

In contrast, with the working examples satisfying the configurations of the present application, damage resistance, low-temperature flexibility, tear resistance, and thermal stability were satisfactory. Moreover, as shown in comparison between working examples, if the ethylene-vinyl ester copolymer was an ethylene-vinyl ester-carbon monoxide terpolymer having a ketone backbone in its main chain, the damage resistance, the low-temperature flexibility, and the tear resistance further increased (Working Examples 1, 4, and 5). If the ethylene-vinyl ester copolymer contained a vinyl ester in an amount of 30 mass % or more, the tear resistance further increased (Working Examples 4 and 5). If the ethylene-α,β-unsaturated carboxylic acid ester copolymer contained an α,β-unsaturated carboxylic acid ester in an amount of 15 mass % or more, the tear resistance further increased (Working Examples 6 to 9). If the melt flow rate of the ethylene-α,β-unsaturated carboxylic acid ester copolymer was 5 g/10 minutes or less, the low-temperature flexibility further increased (Working Examples 6 to 9).

Moreover, according to Working Examples 1 and 17 to 22, it was found that the abrasion resistance increased by further blending a filler. Among fillers, it was found that use of calcium carbonate further increased the abrasion resistance. Also, it was found that if an average particle diameter of the filler was in a range of 0.05 to 1.5 the abrasion resistance further increased. Here, Comparative Example 7 was an example that contained a filler but did not contain a specific ethylene-based copolymer. Comparative Example 8 was an example that contained a filler and a processing aid (chlorinated PE) instead of a specific ethylene-based copolymer. Comparative Example 9 was an example that contained a filler and a low temperature modifier (MBS) instead of a specific ethylene-based copolymer. According to Comparative Examples 7 to 9, it was found that if a specific ethylene-based copolymer was not included even though a filler was included, the abrasion resistance increase effect of the filler was not obtained. Not only that, but Comparative Examples 7 to 9 had poor abrasion resistance. Based on that, it was found that the abrasion resistance increase effect was not obtained by adding only a filler, and the abrasion resistance was increased by using a filler in combination with a specific ethylene-based copolymer.

Although embodiments of the present application were described in detail above, the present invention is not merely limited to the above-described embodiments, and it will be appreciated that various modifications can be made without departing from the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Insulated electric wire
12 Conductor
14 Insulating coating layer

The invention claimed is:

1. A composition for an electric wire coating material containing polyvinyl chloride,
wherein the composition contains a plasticizer in an amount of 15 to 30 parts by mass, one or more ethylene-based copolymers selected from ethylene-vinyl ester copolymers and ethylene-α,β-unsaturated carboxylic acid ester copolymers in an amount of 0.1 to 10 parts by mass, and a filler in an amount of 2 to 25 parts by mass, with respect to 100 parts by mass of the polyvinyl chloride, and
an average particle diameter of the filler is in a range of 0.05 to 1.5 μm.

2. The composition for an electric wire coating material according to claim 1, wherein a main chain of the ethylene-vinyl ester copolymer has a ketone backbone.

3. The composition for an electric wire coating material according to claim 1,
wherein the ethylene-vinyl ester copolymer contains a vinyl ester in an amount of 30 mass % or more.

4. The composition for an electric wire coating material according to claim 1,
wherein the ethylene-α,β-unsaturated carboxylic acid ester copolymer contains an α,β-unsaturated carboxylic acid ester in an amount of 15 mass % or more.

5. The composition for an electric wire coating material according to claim 1,
wherein a melt flow rate, which is measured in conformity with JIS K 7210, of the ethylene-α,β-unsaturated carboxylic acid ester copolymer at 190° C. and a load of 2.16 kg is 5 g/10 minutes or less.

6. The composition for an electric wire coating material according to claim 1,
wherein the filler is calcium carbonate.

7. An insulated electric wire in which the composition for an electric wire coating material according to claim 1 is used in an electric wire coating material.

* * * * *